United States Patent
Ko

[11] Patent Number: 6,097,128
[45] Date of Patent: Aug. 1, 2000

[54] DUST GUARD

[75] Inventor: Fretrick Siu Kwan Ko, Yuen Long, The Hong Kong Special Administrative Region of the People's Republic of China

[73] Assignee: Johnson Electric S.A., La Chaux-de-Fonds, Switzerland

[21] Appl. No.: 09/348,624

[22] Filed: Jul. 6, 1999

[30] Foreign Application Priority Data

Jul. 8, 1998 [GB] United Kingdom .................... 9814690

[51] Int. Cl.⁷ .............................. H01R 39/38; H02K 5/10
[52] U.S. Cl. .............................................. 310/239; 310/88
[58] Field of Search .................................... 310/67 R, 85, 310/86, 88, 89, 227, 228, 229, 239, 238, 242, 246, 247

[56] References Cited

U.S. PATENT DOCUMENTS

| | | | |
|---|---|---|---|
| 1,145,516 | 7/1915 | Schmid-Roost | 384/478 |
| 3,791,774 | 2/1974 | Vonk | 417/423.2 |
| 4,659,950 | 4/1987 | Gotoh | 310/59 |
| 4,959,576 | 9/1990 | Horibe et al. | 310/239 |
| 5,185,544 | 2/1993 | Takada | 310/58 |
| 5,296,772 | 3/1994 | Bradfield et al. | 310/242 |
| 5,424,600 | 6/1995 | Ishikawa et al. | 310/220 |
| 5,517,072 | 5/1996 | Hildebrandt | 310/228 |
| 5,550,418 | 8/1996 | Chung | 310/239 |
| 5,895,995 | 4/1999 | Soh | 310/239 |

FOREIGN PATENT DOCUMENTS

| | | |
|---|---|---|
| 1005433 | 9/1965 | United Kingdom . |
| 1367418 | 9/1974 | United Kingdom . |
| 2320818 | 7/1998 | United Kingdom . |

OTHER PUBLICATIONS

JP 4161036, Abstract, Jun. 4, 1992.

*Primary Examiner*—Nestor Ramirez
*Assistant Examiner*—Dang Dinh Le
*Attorney, Agent, or Firm*—Birch, Stewart, Kolasch & Birch, LLP

[57] ABSTRACT

A dust guard for a universal motor has a body with an aperture for press-fit mounting to a brush holder. A hood extends from the body to give the dust guard a cup-like shape. The edge of the hood is shaped to follow a commutator surface. The hood has a passageway in each lateral side for drawing dust laden air into the flow of cooling air for the motor. Air guides formed on the outside of the dust guard adjacent the exits of the passageways assist in drawing out the dust laden air from the interior of the hood. Oil reservoirs form dust collection sites within the dust guard. The oil reservoirs include recesses filled with closely spaced projections to retain oil in the recesses by capillary action.

9 Claims, 4 Drawing Sheets

DUST GUARD

BACKGROUND OF THE INVENTION

1. Field of the Invention

This invention relates to electric motors and in particular, to fractional horsepower universal motors as used in household appliances.

2. Background Art

Universal motors have a wound rotor with carbon brushes rubbing on a commutator to transfer electrical power to the rotor windings. In typical fractional horsepower universal motors, end brackets mounted to either end of the stator core support the rotor bearings. One end bracket also supports the cages for the brushes. Usually the end brackets are bent metal plates for good strength characteristics allowing a minimal axial length and providing an earthing function for the motor shaft via the bearings.

During operation of the motor, the brushes wear on the commutator generating considerable dust. This dust is conductive and builds up on the end bracket and around the brush cage assembly which is an insulating plastic body fixed to the end bracket and the brush slides directly in a hole in the plastic body for guiding the brush to the commutator. When sufficient dust has built up around the brush assembly, tracking may occur between the brush and the end bracket leading to an earth fault or insulation breakdown. One test, known as a hi-pot test, applies a 1000 volt potential difference between a motor terminal and the stator core or other non-live metallic part of the motor. Current is measured after 1 minute. If the current is more than 5 milliamps, the motor fails the test. For safety reasons, the motor must pass the hi-pot test at the end of its design life. Therefore, as design life increases, something must be done to avoid the build-up of the carbon dust resulting in hi-pot failure (insulation breakdown due to carbon dust build-up).

One prior art solution was to make the end bracket out of an insulating material. While this gave an immediate increase in life, it was still a problem as the carbon dust builds up all over the end bracket eventually allowing tracking. Also, as the plastic material was not as strong as the metallic material, larger end brackets were needed which added to the axial length of the motor.

Another prior art solution uses insulating sheet material, such as MYLAR, to form a dust barrier between the brush cage and the end bracket. This produced a marked increase in life but with improvements in bearings, dust build-up was still a limiting factor in the life of the motor as the dust collected on and under the MYLAR sheet.

Hence, there is a need for some way to avoid the build-up of carbon dust leading to insulation breakdown and thereby extending the useful life of a universal motor.

SUMMARY OF THE INVENTION

The inventor, realising that the problem was not the creation of dust but the failure to adequately handle the removal of the dust, developed a dust guard for a universal motor which has a body with an aperture for receiving a brush. Extending from the body about the aperture is a hood. The hood is arranged to surround that portion of the commutator which contacts the brush. At least one passageway connects the interior of the hood with a cooling airflow through the motor such that in use, dust generated by the wearing of the brush upon the commutator is channelled through the passageway and into the airflow and away from the bearing bracket.

BRIEF DESCRIPTION OF THE DRAWINGS

A preferred embodiment of the invention will now be described by way of example only with reference to the accompanying drawings in which.

DETAILED DESCRIPTION OF THE PREFERRED EMBODIMENTS

Figure 1:
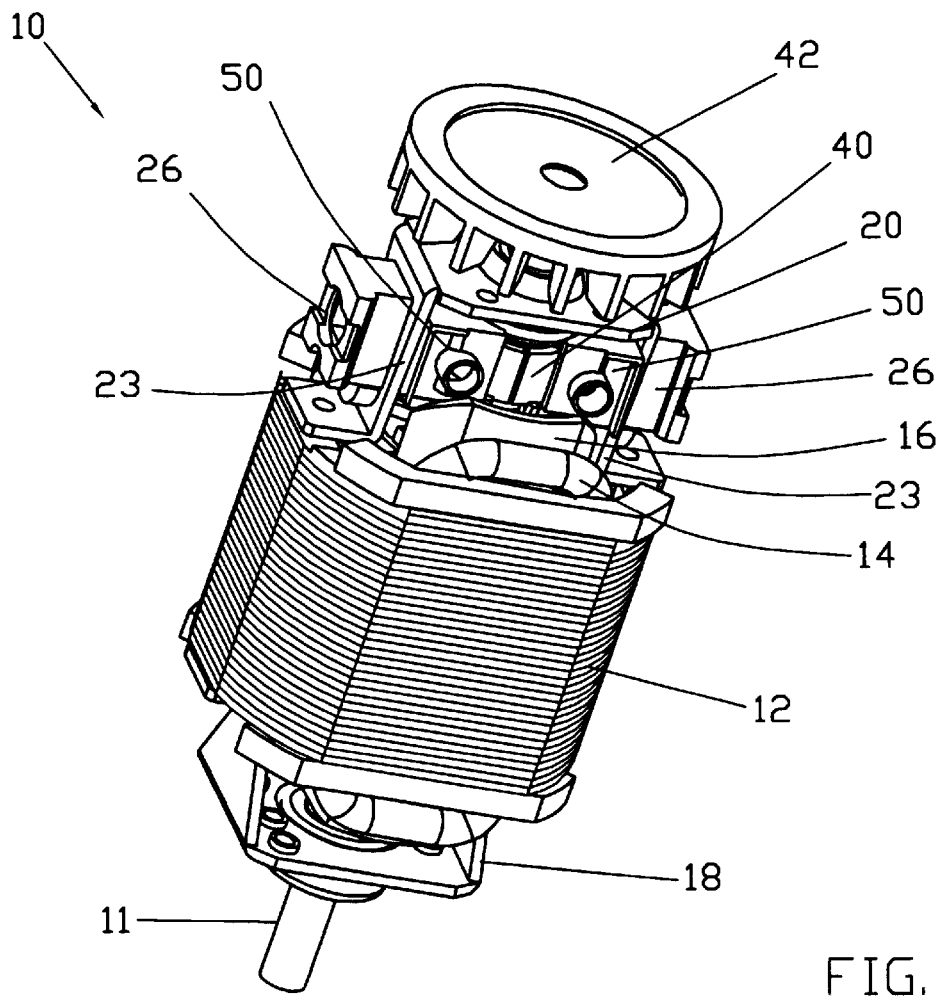
FIG. 1 is a pictorial representation of a universal motor incorporating two dust guards according to the preferred embodiment of the present invention.

FIG. 1 illustrates a universal motor 10 incorporating two dust guards 50 according to the preferred embodiment of the present invention. With the exception of the dust guards 50, the motor 10 is of a standard construction.

The motor 10 has a laminated stator core 12 and a wound rotor. The stator core 12 supports two stator coils 14 (only one visible) and their associated stator insulations 16. At each axial end of the stator core 12 is affixed an end bracket 18, 20 supporting a bearing for a shaft 11 of the rotor. Lower bearing bracket 18 comprises a U-shaped bracket supporting a self-aligning bushing. Upper end bracket 20 is of similar construction except that the side arms 23 have apertures for mounting brush cage assemblies 26. The shaft 11 supports a wound rotor core in opposing relationship with the stator core 12 and a commutator 40 located between brushes of the brush cage assemblies 26. A fan 42 of a centrifugal type is mounted to the shaft externally of the upper or commutator end bracket 20. The two dust guards 50 can be seen surrounding respective portions of the commutator 40 which is in contact with the brushes with which the guards are associated.

Figure 2:
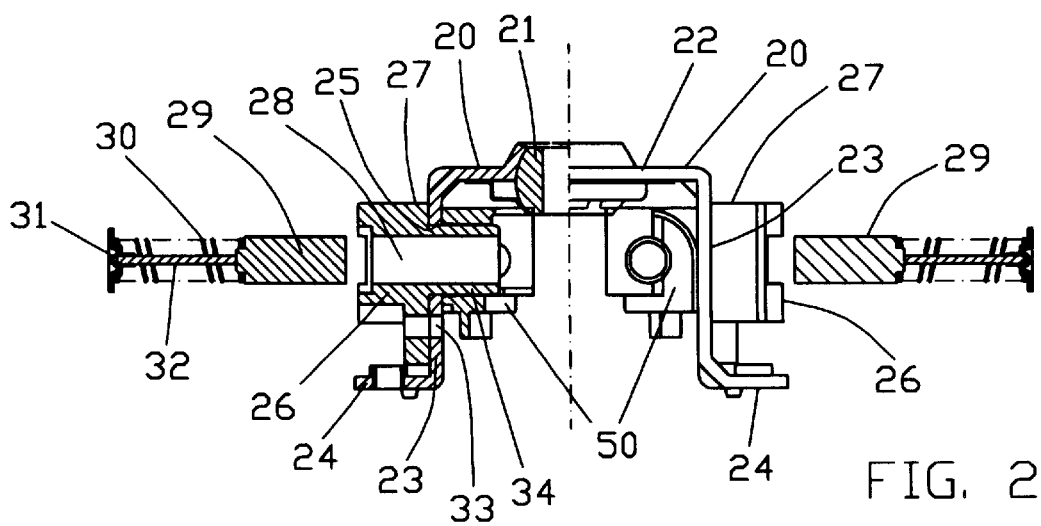
FIG. 2 is a part-sectional view of an end bracket of the motor of FIG. 1 showing brushes, brush cages and the two dust guards of FIG. 1.
Figure 3:
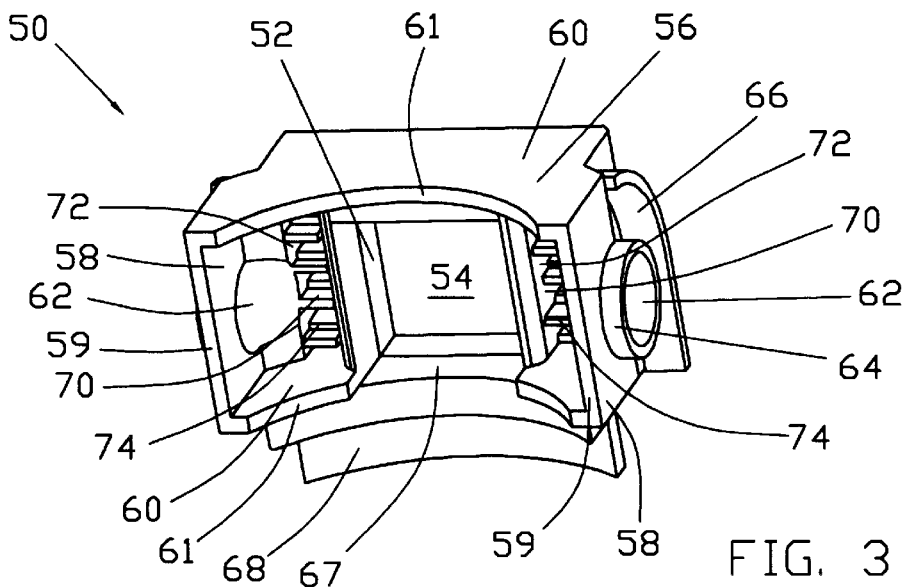
FIG. 3 is a pictorial view of one of the dust guards of FIG. 1.
Figure 4:
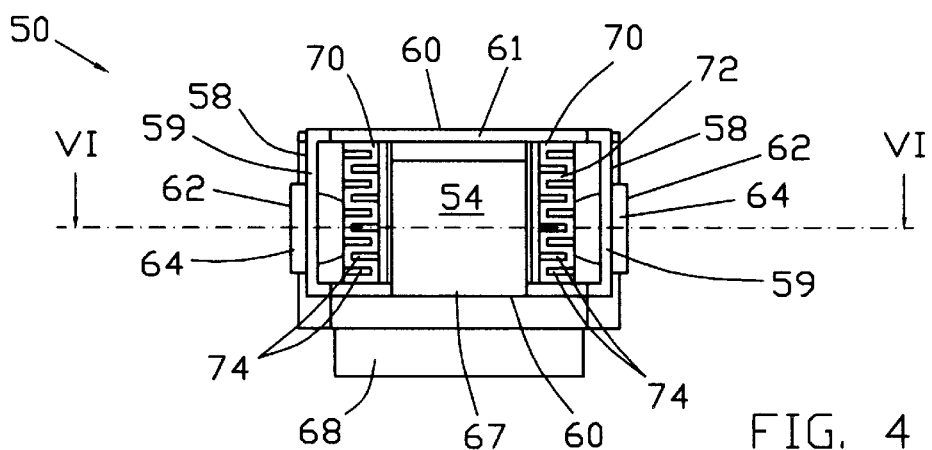
FIG. 4 is a side view of the dust guard of FIG. 3.
Figure 5:
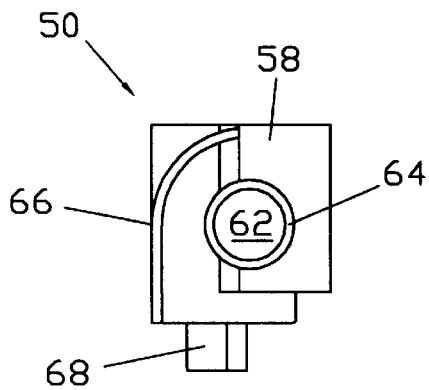
FIG. 5 is an end view of the dust guard of FIG. 3.
Figure 6:
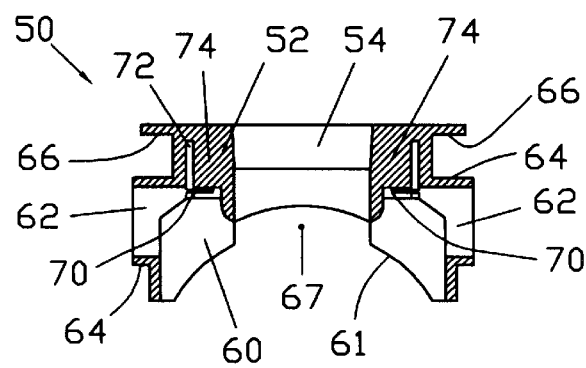
FIG. 6 is a plan view of the dust guard of FIG. 3 sectioned along line VI—VI of FIG. 4.

FIG. 2 is a part sectional view of the commutator end bracket 20 of the motor 1 of FIG. 1. The end bracket 20 has a base 22 and two arms 23 extending perpendicularly to the base 22. Each arm has an outwardly extending hand 24 for fixing to the stator core 12. The base 22 of the end bracket 20 supports a self-aligning bushing 21 held in place by a retaining spring. A brush cage assembly 26 is mounted in an aperture 25 in each side arm 23. Each brush cage assembly 26 comprises a plastic material body 27 having an aperture 28 for slidably receiving a carbon brush 29 which is urged towards the commutator 40 by a spring 30. A brush clip 31 closes the outer end of the aperture 28 and forms the electrical terminal for connecting lead wires to the brush 29. A shunt 32 runs from the brush 29 to the brush clip 31 and the spring 30 bears on the brush clip 31 to urge the brush 29 towards the commutator 40. A mounting hole 33 is provided for riveting the brush assembly 26 to the end bracket 20. The two dust guards 50 are separate from the brush assemblies 26 and are a press fit onto a portion 34 of a respective brush assembly 26 which passes through the end bracket. The dust guards 50 will be described in more detail with reference to FIGS. 3 to 6.

As can be seen from FIGS. 3 to 6, the preferred dust guard 50 is a unitary item having a body 52 of insulating plastic material and thus, can be easily manufactured using an injection molding process.

The body 52 has an aperture 54 for receiving and engaging by an interference fit, a free end of a brush cage. A four-sided hood 56 extends from the body about the aperture 54 to give the body a hollow cup-like shape with a hole in the bottom. Two opposing sides 58 of the hood 56 have straight edges 59. These are the lateral sides. The other two opposing sides 60, the axial sides, have concave edges 61 such that when fitted to the motor 1, the concave edges follow the curvature of the commutator 40 whereby the commutator 40 functions as a loose fitting cover for the hood 56 and the brush cage assembly 26 closes the hole in the bottom of the cup. The two lateral sides 58 each have a passageway 62 and 63 in the form of an aperture with a small external extension 64, leaving the exit of the passageway 62 and 63 sitting proud of each external surface of the lateral sides 58. On the external surface is an air guide in the form of a raised wall 66 for guiding airflow about the exit to increase the airflow speed over the exit. A gap 67 is provided in the lower axial side acting as an air inlet. A skirt 68 extends downwardly from the lower axial side.

Inside the hood 56 between the aperture 54 and each lateral side 58 is located an oil reservoir 70. Each oil reservoir 70 is in the form of a recess 72 in the body 52 with the recess 72 filled with closely spaced projections 74 thereby retaining oil in the recesses by capillary action, i.e., by the small gaps between the projections and surface tension of the oil and forces of cohesion between the walls of the projections and the oil. In this manner, oil is retained within the recesses regardless of the orientation of the dust guard.

The purpose of each oil reservoir 70 is to act as a dust collection point or dust trap to retain some of the carbon dust within the hood. Some of the dust particles will mix with the oil and coagulate and adhere to the inner surfaces of the dust guard, especially within the oil reservoir and will not flow out of the hood through the passageways and into the airflow. By retaining some of the dust within the hood, more dust can be created before insulation breakdown occurs, extending the life of the motor.

Figure 7:
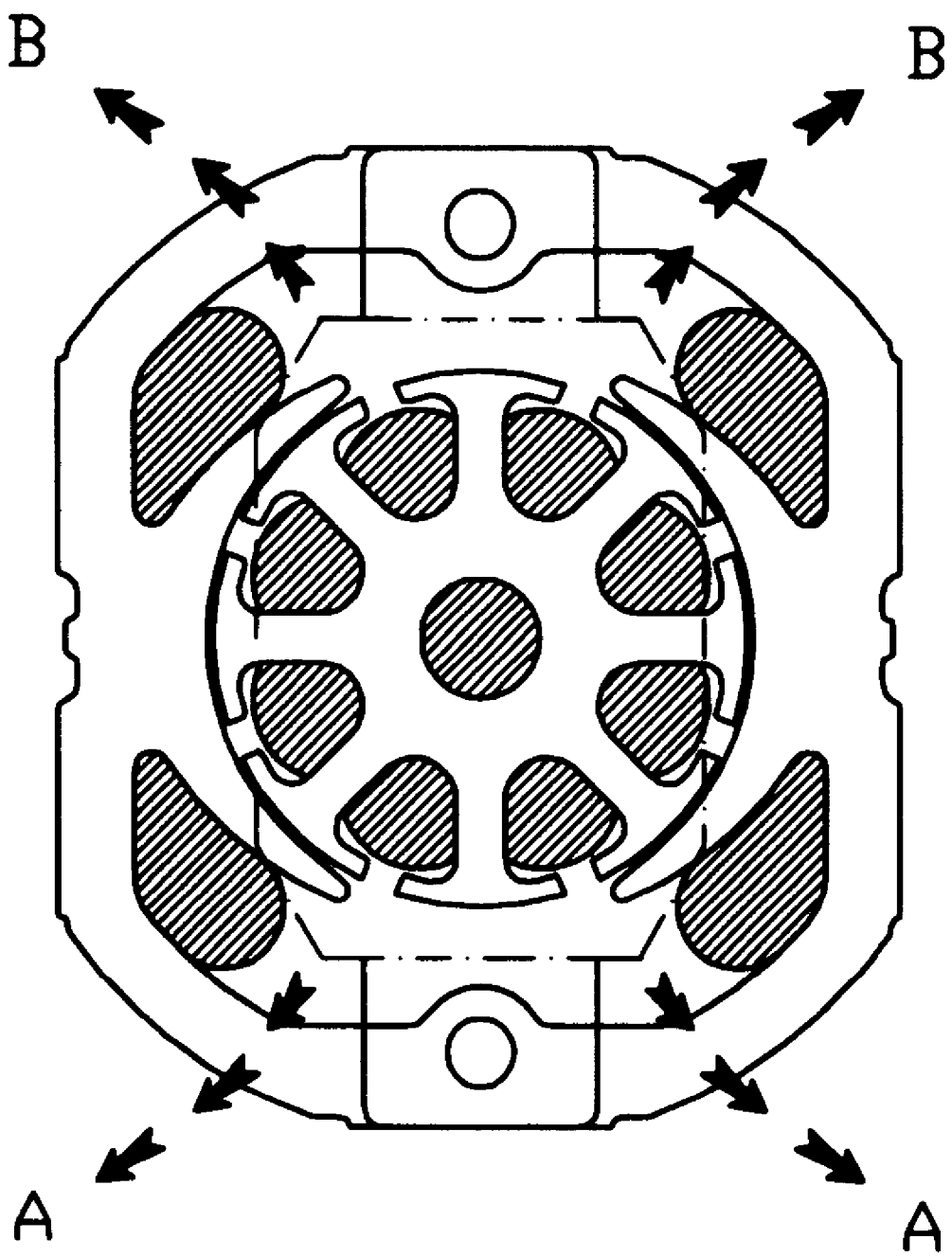
FIG. 7 is a schematic showing main airflow through a cross-section of the motor of FIG. 1.
Figure 8:
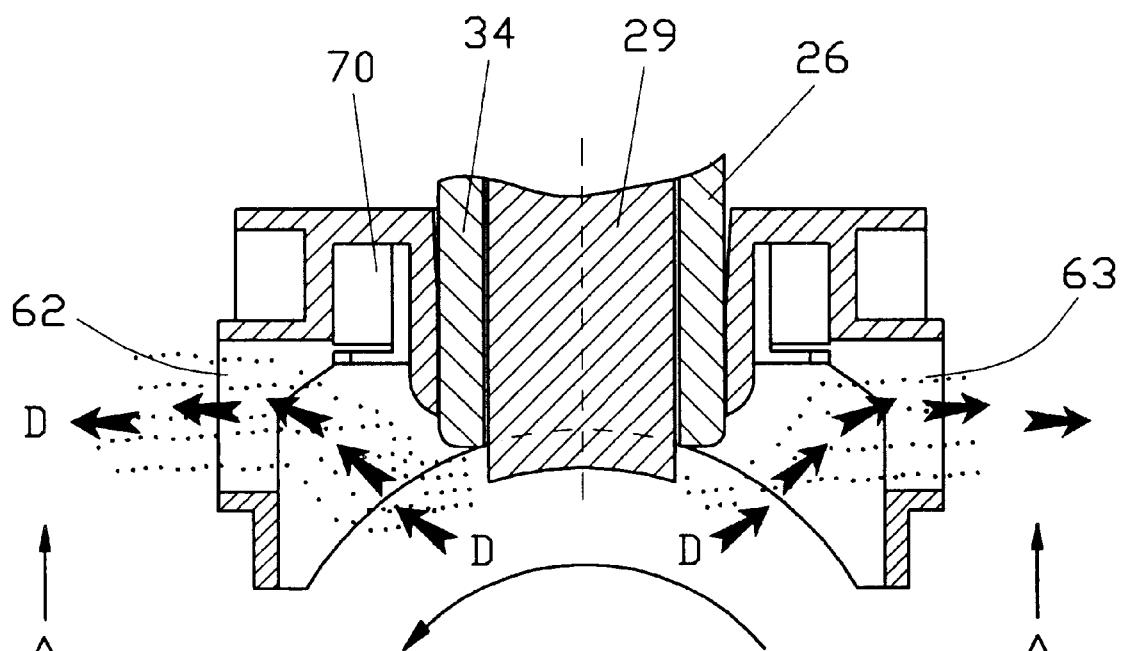
FIG. 8 is a schematic showing airflow through the dust guard.

FIGS. 7 and 8 illustrate the functioning of the dust guards 50. In FIG. 7 which is a view of a cross section of the motor, we can see that the airflow through the motor is limited to two spaces between the poles as indicated by arrows A and B. Each flow is divided into two separate flows by the upper end bracket 20 and brush assemblies 26 such that the airflow passes the lateral sides 58 of the dust guard 50.

FIG. 8 is a sectional schematic view of a dust guard 50 in use. The rotor is rotating in the direction indicated by arrow C (counterclockwise as shown). This creates a bias in the internal airflow towards the left. The external airflow A passing the exits of the passageways 62 and 63 through the hood 56 creates a low pressure area drawing air and the entrained dust from the interior of the dust guard 50 and into the airflow A. Air enters the hood 56 through the space between the hood 56 and the commutator 40, predominantly through the gap 67 formed in the bottom axial side thereby creating a flow of air through the hood 56 as indicated by arrows D. Some dust, at least initially, will mix with the oil in the oil reservoir and thus will be trapped and retained within the hood. A significant amount of air with dust flows out through passageway 62, but of course, some air with dust will flow out through the right hand side passageway 63 as well.

Although one preferred embodiment has been described, modifications will be obvious to those skilled in the art and it is intended that all such variations fall within the scope of the invention as defined by the appended claims.

What is claimed is:

1. A dust guard for a universal motor having a commutator, brushes, cages for guiding the brushes to the commutator and a fan for generating an airflow for cooling the motor, the guard comprising:

a body having an aperture for receiving a brush cage;

a hood extending from the body about the aperture and arranged to surround a portion of the commutator in contact with the brush of the cage received by the aperture and forming an open interior;

a gap formed in an axial side of said hood, said gap providing an air inlet for the airflow; and at least one passageway connecting an interior of the hood with the airflow;

whereby, during use of the motor, dust generated by wearing of the brush on the commutator is channeled through the passageway and into the airflow.

2. The dust guard of claim 1, wherein the hood has an edge shaped to closely follow the surface of the commutator.

3. The dust guard of claim 2, wherein the hood has two passageways extending through respective lateral sides of the hood.

4. The dust guard of claim 1, wherein the hood has two passageways extending through respective lateral sides of the hood.

5. The dust guard of claim 1, wherein a dust collecting region is formed within the hood adjacent the aperture.

6. The dust guard of claim 5, wherein the dust collecting region includes at least one oil reservoir.

7. The dust guard of claim 6, wherein the or each oil reservoir comprises a plurality of closely spaced projections located within a recess and arranged to retain oil within the recess.

8. The dust guard of claim 1, wherein an air guide is formed on an outer surface of the hood adjacent the or each passageway.

9. A universal motor having a stator, a rotor including a commutator, a fan fixed to the rotor for generating air flow through the stator for cooling the motor, a metallic end bracket fixed to one end of the stator and supporting a bearing for the rotor, a pair of brush cages fitted to openings in the end bracket, a pair of brushes slidably received in the brush cages and urged into contact with the commutator by brush springs, and a pair of dust guards for preventing carbon dust build up from electrically shorting the brushes to the end bracket, each dust guard comprising, a body having an aperture fitted about a respective one of the pair of brush cages, a hood extending from the body about the aperture and surrounding a portion of the commutator in contact with the brush of the brush cage to which the body is fitted, the hood having an interior and an open edge which is shaped to closely follow a surface of the commutator, a gap formed in an axial side of the hood, the gap providing an air inlet for the airflow generated by the fan, and two passageways passing through opposite side portions of the hood, each passageway leading from the interior of the hood to the exterior of the hood, whereby in use, dust particles are drawn out of the hood through the passageways and into the airflow and carried away from the motor.

* * * * *